US012450639B2

(12) United States Patent  
Arnaout et al.

(10) Patent No.: US 12,450,639 B2  
(45) Date of Patent: Oct. 21, 2025

(54) BROWSER PLUG-IN FOR IDENTIFICATION AND DISPLAY OF ALTERNATIVE PRODUCTS FOR PURCHASE

(71) Applicant: MERCARI, INC., Palo Alto, CA (US)

(72) Inventors: Dani Arnaout, San Francisco, CA (US); Jihad Kawas, San Francisco, CA (US)

(73) Assignee: MERCARI, INC., Palo Alto, CA (US)

( * ) Notice: Subject to any disclaimer, the term of this patent is extended or adjusted under 35 U.S.C. 154(b) by 28 days.

(21) Appl. No.: 17/886,800

(22) Filed: Aug. 12, 2022

(65) Prior Publication Data

US 2023/0016483 A1    Jan. 19, 2023

Related U.S. Application Data

(63) Continuation of application No. 16/357,754, filed on Mar. 19, 2019, now Pat. No. 11,449,915.

(60) Provisional application No. 62/744,497, filed on Oct. 11, 2018.

(51) Int. Cl.

| G06Q 30/0601 | (2023.01) |
|---|---|
| G06F 16/25 | (2019.01) |
| G06F 16/9535 | (2019.01) |
| G06F 16/9538 | (2019.01) |

(52) U.S. Cl.  
CPC ....... *G06Q 30/0629* (2013.01); *G06F 16/252* (2019.01); *G06F 16/9535* (2019.01); *G06F 16/9538* (2019.01); *G06Q 30/0603* (2013.01); *G06Q 30/0627* (2013.01)

(58) Field of Classification Search  
None  
See application file for complete search history.

(56) References Cited

U.S. PATENT DOCUMENTS

| 9,721,036 B2 | 8/2017 | Shen et al. |
|---|---|---|
| 11,449,915 B2 | 9/2022 | Arnaout et al. |
| 2002/0112153 A1 | 8/2002 | Wu et al. |
| 2004/0124128 A1 | 7/2004 | Iwata |
| 2006/0112099 A1 | 5/2006 | Musgrove et al. |
| 2007/0185865 A1 | 8/2007 | Budzik et al. |
| 2007/0198727 A1 | 8/2007 | Guan |

(Continued)

FOREIGN PATENT DOCUMENTS

| CN | 1255680 C | 6/2000 |
|---|---|---|
| CN | 1410918 A | 4/2003 |

(Continued)

OTHER PUBLICATIONS

IP.com Disclosure No. IPCOM000182423D Publication Date: Apr. 30, 2009, (Year: 2009).*

(Continued)

*Primary Examiner* — Michelle T Kringen  
(74) *Attorney, Agent, or Firm* — Sterne, Kessler, Goldstein & Fox P.L.L.C.

(57) ABSTRACT

Provided herein are system, apparatus, device, method and/or computer program product embodiments, and/or combinations and sub-combinations thereof, for identifying second products in an inventory of a second ecommerce site that are at least similar to a first product currently being displayed to an user by a first ecommerce site, and displaying the second products for viewing and purchase by the user at the first ecommerce site.

15 Claims, 9 Drawing Sheets

(56) References Cited

U.S. PATENT DOCUMENTS

| | | | |
|---|---|---|---|
| 2010/0100607 A1 | 4/2010 | Scholz et al. | |
| 2012/0066072 A1 | 3/2012 | Kanigsberg et al. | |
| 2012/0123674 A1 | 5/2012 | Perks et al. | |
| 2012/0239534 A1 | 9/2012 | Kniaz et al. | |
| 2013/0262979 A1 | 10/2013 | Gu et al. | |
| 2014/0136332 A1 | 5/2014 | Amit et al. | |
| 2014/0236622 A1 | 8/2014 | Southam | |
| 2015/0066684 A1 | 3/2015 | K. V et al. | |
| 2015/0220979 A1* | 8/2015 | Ouimet | G06Q 30/0633 705/14.49 |
| 2016/0012465 A1* | 1/2016 | Sharp | G06Q 20/321 705/14.17 |
| 2016/0239892 A1 | 8/2016 | Kim et al. | |
| 2016/0299973 A1 | 10/2016 | Oakeson | |
| 2019/0334848 A1* | 10/2019 | Chen | H04L 51/226 |
| 2020/0089747 A1 | 3/2020 | Hofer et al. | |
| 2020/0118190 A1 | 4/2020 | Arnaout et al. | |

FOREIGN PATENT DOCUMENTS

| | | |
|---|---|---|
| CN | 1952929 A | 4/2007 |
| JP | 2004171051 A | 6/2004 |
| JP | 2016026344 A | 2/2016 |
| JP | 2016504655 A | 2/2016 |
| KR | 101443158 B1 | 9/2014 |
| KR | 20160111236 A | 9/2016 |
| KR | 10-2018-0083228 A | 7/2018 |

OTHER PUBLICATIONS

Written Opinion and International Search Report from International Application No. PCT/US2019/054628 dated Jan. 17, 2020 (11 pages).

A. K. Tripathy and R. Olivera, "UProRevs-User Profile Relevant Results," 10th International Conference on Information Technology (ICIT 2007), 2007, pp. 271-276, doi : 10.1109/ICIT.2007.39 (Year: 2007).

International Preliminary Report on Patentability directed to related International Application No. PCT/US2019/054628, mailed Apr. 8, 2021; 6 pages.

European Search Report directed to related European Application No. 19871577.3, mailed Jun. 7, 2022; 14 pages.

Office Action directed to related Japanese Application No. 2021-518740, with English-language machine translation attached, mailed Apr. 15, 2024; 6 pages.

Examination report No. 2 for standard patent application, dated Aug. 9, 2024, Australian Patent Application No. 2019358810, 4 pages.

Ferrara, E. et al., Web Data Extraction, Applications and Techniques: A Survey. Knowledge-based Systems, 2014, vol. 70, pp. 301-323.

English Translation of CN 195929 A.

* cited by examiner

US 12,450,639 B2

BROWSER PLUG-IN FOR IDENTIFICATION AND DISPLAY OF ALTERNATIVE PRODUCTS FOR PURCHASE

CROSS-REFERENCE TO RELATED APPLICATIONS

This application is a continuation of U.S. patent application Ser. No. 16/357,754 titled "Plug-In Enabled Identification And Display Of Alternative Products For Purchase," filed Mar. 19, 2019 which claims priority to U.S. Provisional Appl. No. 62/744,497 titled "Plug-In Enabled Identification And Display Of Alternative Products For Purchase," filed Oct. 11, 2018, both of which are herein incorporated by reference in their entireties.

BACKGROUND

Field

This disclosure is generated related to enabling consumers to search, browse and purchase on-line in a more effective manner.

Background

When shopping on an ecommerce site, generally, a consumer searches for a product, finds the product, and then decides whether or not to purchase the product. Typically, such decisions are made by consumers without awareness of inventory available from other online sellers. Thus, consumers often overspend when purchasing online, because they are unaware of the same (or similar) products being offered at lower prices by other online sellers. They may also be unaware of other available products that may better suit their needs.

SUMMARY

Provided herein are system, apparatus, device, method and/or computer program product embodiments, and/or combinations and sub-combinations thereof, for identifying second products in an inventory of a second ecommerce site that are at least similar to a first product currently being displayed to an user by a first ecommerce site, and displaying the second products for viewing and purchase by the user at the first ecommerce site.

In some embodiments, the method operates by receiving product information pertaining to the first product; cleaning and weighing the product information to generate search parameters; searching the inventory using the search parameters to identify the second products; ordering a listing of the second products such that it is more likely that the second products appearing first in the listing are (1) most similar to the first product, and (2) of most interest to the user; and transmitting the listing to a plug-in application, wherein the plug-in application operates with a browser that is being used to display the first ecommerce site, to display the listing to the user.

The product information may be cleaned and weighted to generate search parameters by: identifying a category of the first product based on identifying, in the product information, keywords associated with the category; identifying, in the product information, characteristics associated with the category; and applying weights to the characteristics, wherein the weighted characteristics constitute the search parameters.

The listing may be ordered based on the weighted characteristics.

In some embodiments, the category, the characteristics and the weights may be determined based on monitoring and analyzing activity of users while interacting with the second ecommerce site.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for identifying objects in an inventory from a second ecommerce site that are the same or similar to a product being offered in a first ecommerce site, and displaying them for both viewing and purchase by users at the first ecommerce site.

Figure 1A:
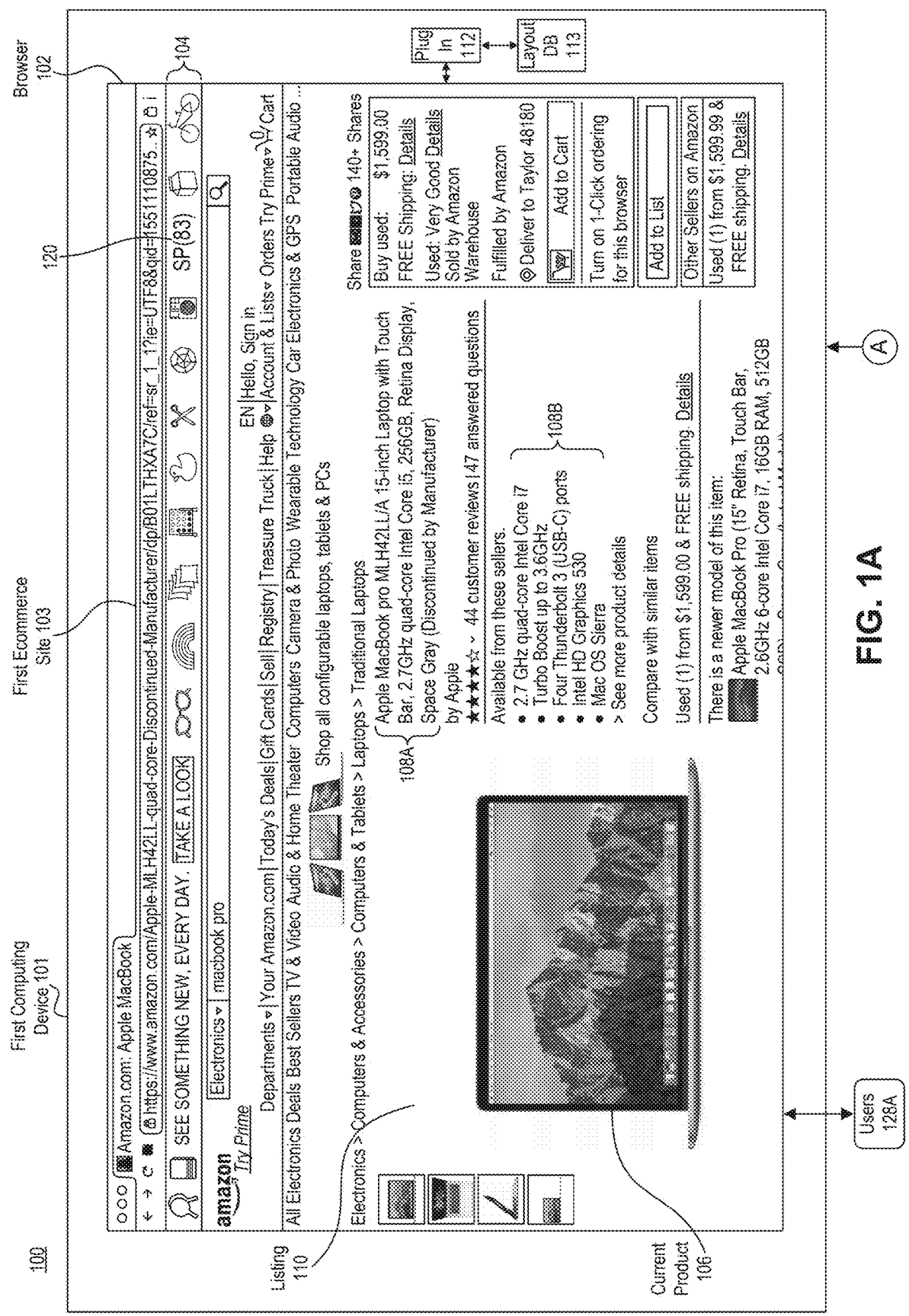
FIGS. 1A and 1B collectively illustrate a system having first and second ecommerce sites, where an example browser window is displayed by the first ecommerce site, and where the browser window displays therein a product for sale and a button indicating a number of objects similar to the product, where the similar products are being offered for sale by the second ecommerce site, according to some embodiments.
Figure 1B:
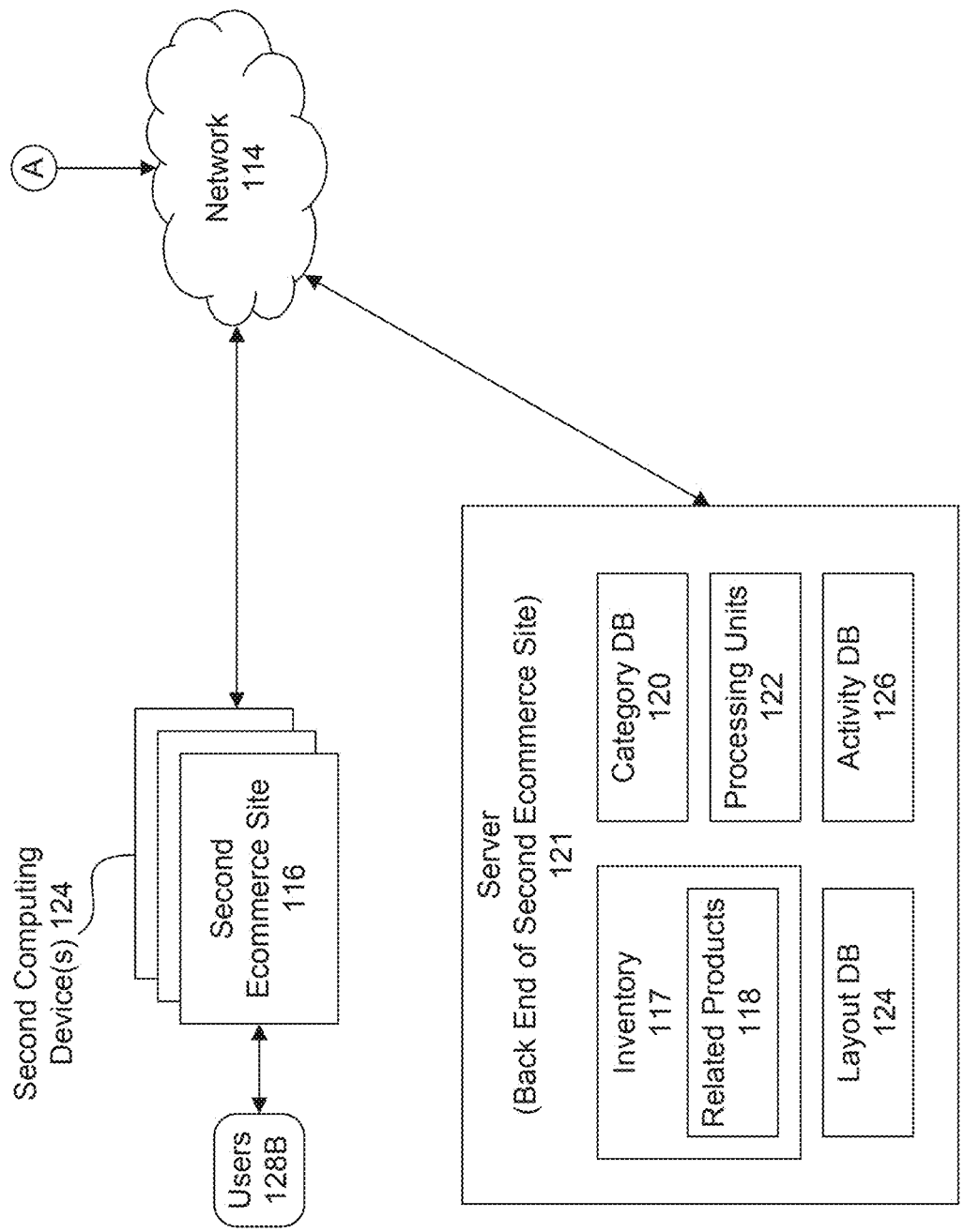

FIGS. 1A and 1B collectively illustrate a system 100 that includes a first computing device 101 connected to a network 114. The network 114 can be the Internet, for example, and may be comprised of wired and/or wireless components.

The first computing device 101 includes a browser 102 which operates with a plug-in application 112. Both the browser and plug-in application 112 execute in the first computing device 101. The computing device 101 could comprise a laptop computer, smartphone, tablet, wearable (such as a watch or eyewear), Internet of Things (IoT) device, appliance, personal digital assistant, voice responsive computing device, and/or any other electronic computing device, to name just some examples.

The browser 102 may display a page from a first ecommerce site 103 that is being accessed by a user 128A. In the example of FIG. 1A, the first ecommerce site 103 is AMAZON.COM, although this disclosure is not limited to AMAZON.COM. Instead, this disclosure is applicable to any ecommerce site that may be accessed via the network 114.

The browser 102 may include a toolbar 104 having any number of buttons, icons and/or badges that provide quick access to features, functionalities, information, apps, etc. For example, the toolbar 104 may include a SP (similar products) button 120. As shown, the SP button 120 includes the letters SP and a number in parenthesis (the number is 83 in the example of FIG. 1A). However, the SP button 120 can be displayed in the toolbar 104 using any other pre-selected letters, numbers, symbols, graphics, icons, emoji, etc.

The browser 102 may display a product listing 110 directed to a product 106 that is being offered for sale on the first ecommerce site 103. For example, the product 106 could be an APPLE MACBOOK computer as shown in the example of FIG. 1A. The product listing 110 may include product information 108 that describes the product 106. The product information 108 may include a title 108A of the product 106, and other more detailed information 108B describing the product 106.

The system 100 may include one or more second computing devices 124. In the example of FIG. 1B, user(s) 128B may be accessing a second ecommerce site 116 via browser(s) executing in the second computer device(s) 124. In an embodiment, the second ecommerce site 116 is MERCARI, although this disclosure is not limited to that example. Instead, the second ecommerce site 116 may be any ecommerce site accessible via network 114 and having the structure and functionality described herein.

In some embodiments, a server 121 supports and operates as the backend of the second ecommerce site 116. The server 121 is sometimes called the backend server 121 of the second ecommerce site 116. The backend server 121 may include any number of servers 121 that are accessible via the network 114.

The backend server 121 includes a database of an inventory 117 of products, articles, items, objects, services, etc. (collectively referred to herein as "products") that are being offered for sale on the second ecommerce site 116. Each product in the inventory 117 is associated with at least one category, and information pertaining to the categories is stored in a category database (DB) 120. Processing units 122 (such as software modules) execute in the server 121 and are configured to perform the functions described herein.

Generally in practice, for example, the user 128A browsers the first ecommerce site 103 on the first computing device 101 for products to purchase. For example, perhaps the user 128A is interested in buying an APPLE MACBOOK as shown in the example of FIG. 1A. Upon landing on the product listing 110 of the APPLE MACBOOK, the user 128A can study the product information 108 in order to decide whether to buy the APPLE MACBOOK in the product listing 110.

But in this example scenario, the user 128A is basing his purchase decision solely on the APPLE MACBOOK being offered on the first ecommerce site 103. It is possible that the same or similar products are being offered on other ecommerce sites at lower prices and/or with other advantages (such as more or enhanced features). Thus, by basing his purchase decision solely on products for sale on the first ecommerce site 103, the user 128A may pay more and/or may purchase an inferior product, compared to products that are being offered for sale on other ecommerce sites.

This disclosure solves this problem by enabling the user 128A to view products from the inventory 117 of the second ecommerce site 116, that are the same or similar to the product 106 (that is, the APPLE MACBOOK in the example of FIG. 1A) that is the subject of the product listing 110 currently being displayed in the browser 102 executing in the first computing device 101. Such same or similar products are sometimes herein referred to as related products 118.

In some embodiments, the number of related products 118 from inventory 117 is indicated by the SP button 120. In the example of FIG. 1A, there are 83 related products 118.

Figure 2:
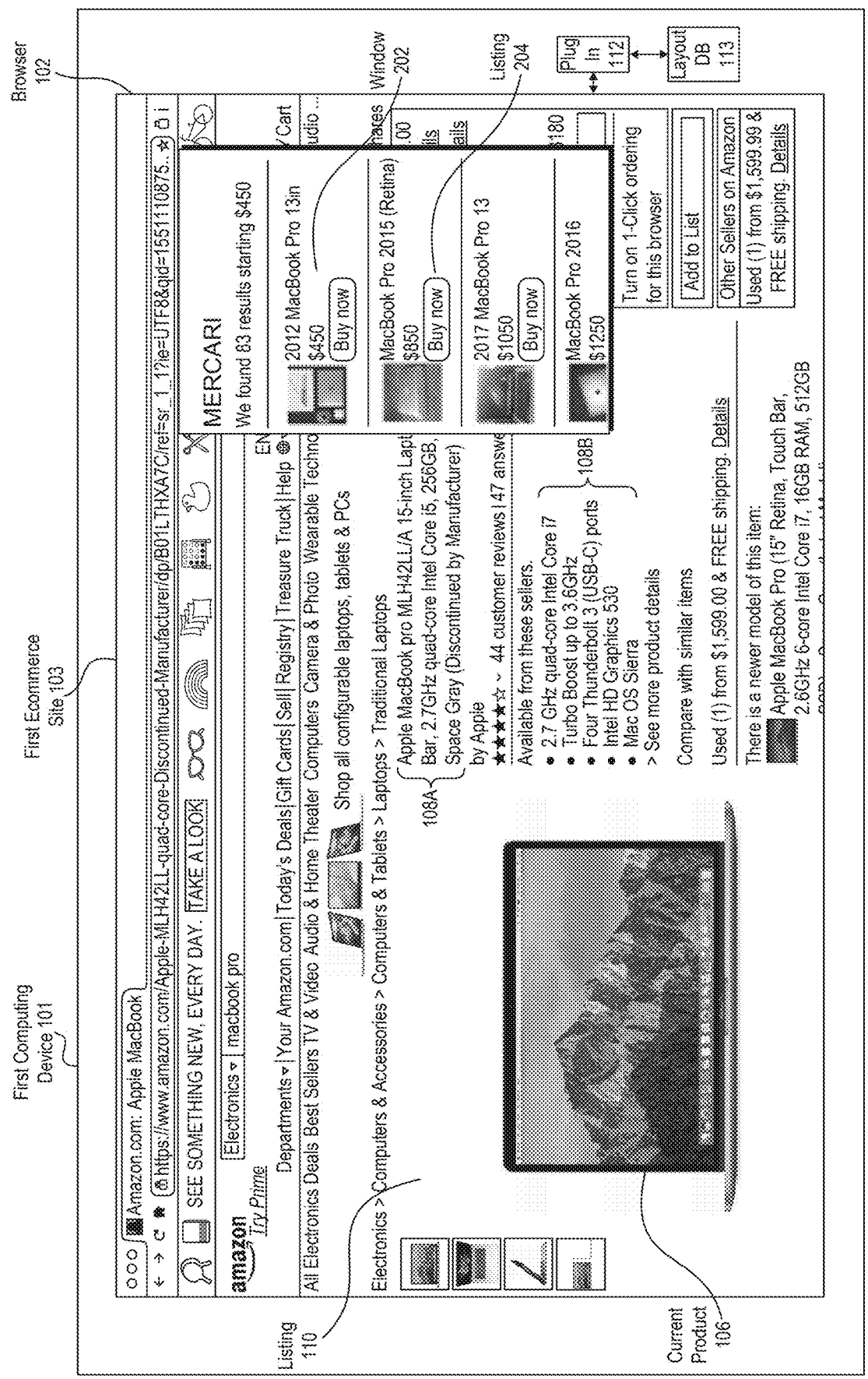
FIG. 2 is the browser window of FIG. 1A, illustrating also a window listing the similar products that are being offered for sale on the second ecommerce site, according to some embodiments.

In some embodiments, the user 128A may click or otherwise select the SP button 120 to view and browse the related products 118. This is shown in FIG. 2, where upon selecting the SP button 120, the browser 102 displays window 202 of a scrollable listing 204 of the related products 118. As noted above, the related products 118 are products from the inventory 117 of the second ecommerce site 116, that are the same or similar to the product 106 in the product listing 110 currently being displayed in the browser 102 executing in the first computing device 101. This product 106 is sometimes called herein the "currently displayed product 106" or the "current product 106."

Thus, in some embodiments, the user 128A (using the first computing device 101) may browse the first ecommerce site 103 for products of interest, such as current product 106. The plug-in application 112 continuously analyzes pages being viewed by the user 128A. For example, the plug-in application 112 identifies the product 106 that is currently being displayed in the browser 102, and then accesses the backend server 121 of the second ecommerce site 116 to identify related products 118 that are the same or similar to the current product 106. The plug-in application 112 then causes a list 204 of these related products 118 to be displayed in the browser 102 executing on the first computing device 101, when the user 128A selects the SP icon 120. In this way, the user 128A becomes better informed of products that are being offered for sale throughout the Internet, and can either buy the current product 106 being offered by the first ecommerce site 103, or one of the related products 118 being offered by the second ecommerce site 116.

The present disclosure achieves this functionality and advantages without requiring the user 128A to open multiple windows or tabs in the browser 102 or other browsers (that is, a tab for the first ecommerce site 103 and a tab for the second ecommerce site 116). This is technically advantageous because it reduces the amount of computer memory and processing needed to execute the browser 102 in the first computing device 101. Also, latency and the demands on the network 114 are reduced, because the plug-in application 112 can access the backend server 121 in the background (for information regarding the related products 118) while the user 128A is viewing the listing 110, rather than upon the demand of the user 128A when he selects the SP icon 120.

Figure 3:
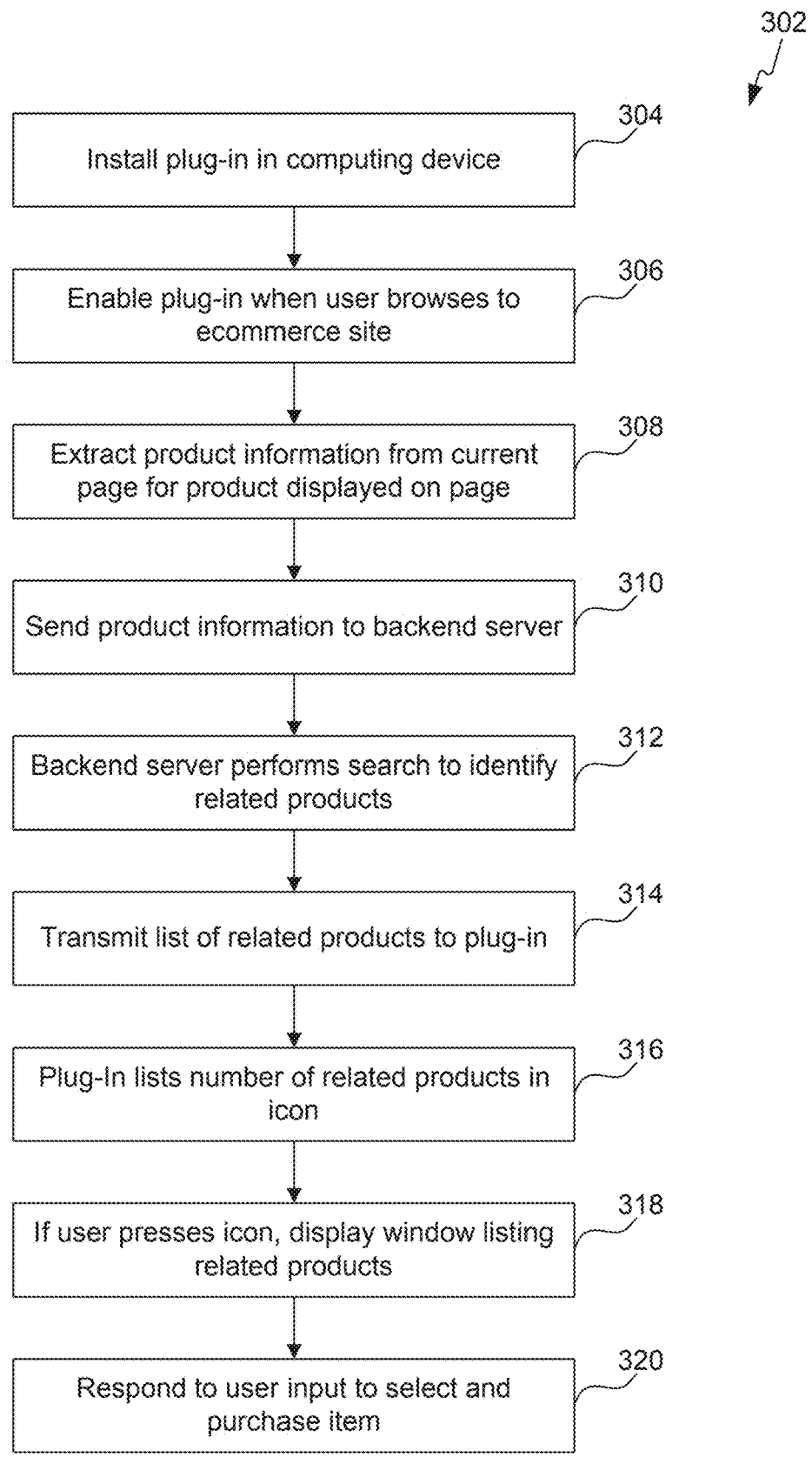
FIGS. 3-7 are flowcharts illustrating example processes relating to FIGS. 1A, 1B and 2, according to some embodiments.

FIG. 3 is a flowchart for a method 302 for performing the functionality described above, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 302 shall be described with reference to FIGS. 1A, 1B and 2. However, method 302 is not limited to that example embodiment.

In 304, the plug-in application 112 is downloaded and installed on the first computing device 101 in a well known manner.

In 306, the plug-in application 112 determines when the user 128A browses to an ecommerce site, such as AMAZON.COM, EBAY.COM, WAYFARE.COM, MACYS.COM, TARGET.COM, etc., to name just some examples. According to some embodiments, some ecommerce sites are supported sites. For such supported sites, the plug-in application 112 is aware of where information is located on pages of the sites, such as where product information 108 is located in product listings 110. This may be achieved, for example, by storing layout information in a layout database (DB) 113. The layout information specifies the layouts of pages (for listings 110) of the supported sites.

Figure 4:
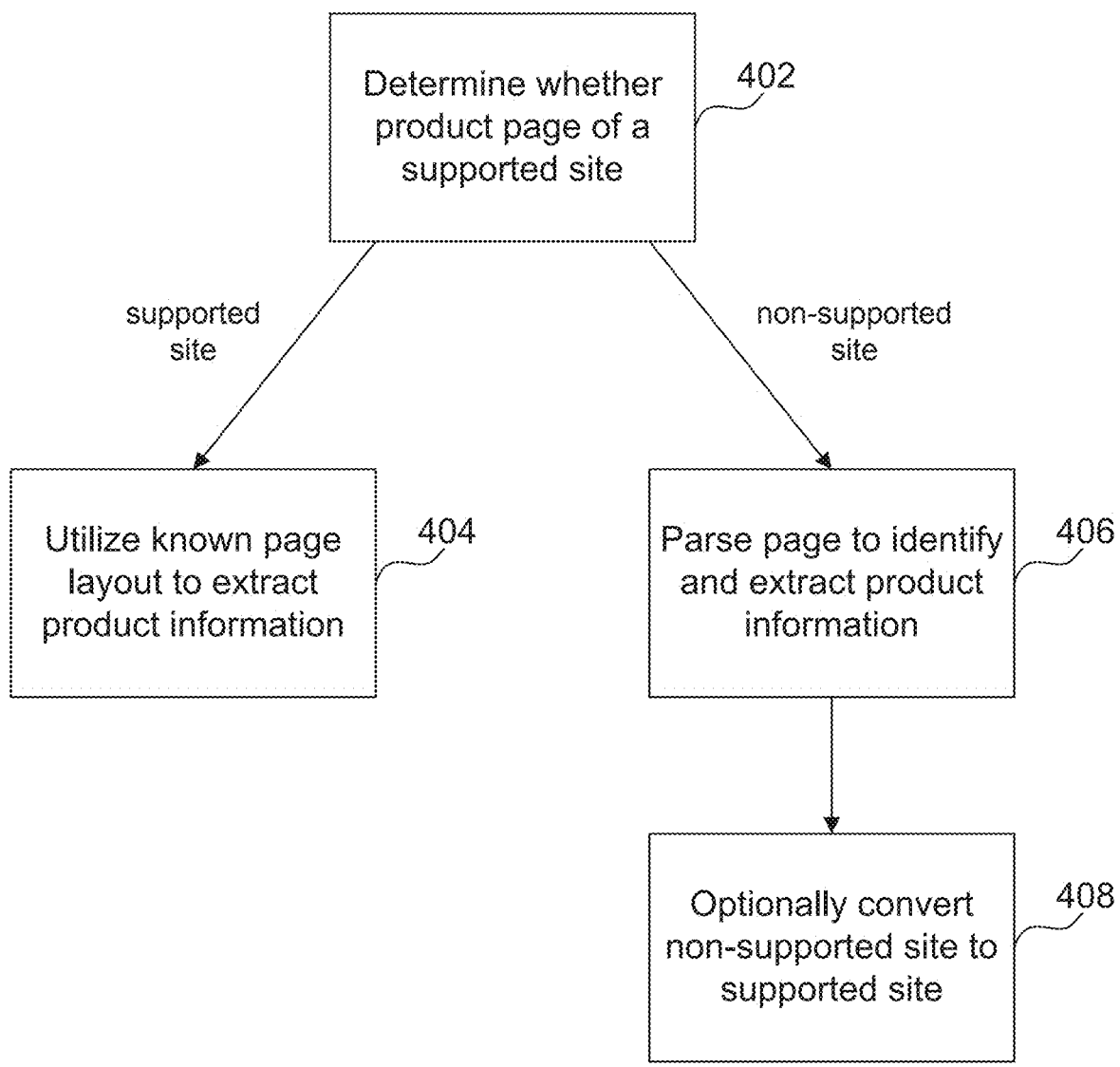

In 308, the plug-in application 112 extracts product information 108 about product 106 from the listing 110 currently displayed on the browser 102 of the first computing device 101. The product information 108 is specific to and represents information about the current product 106, such as make, model, year, color, size, price, category, metadata in the listing 110, etc. Operation of 308, according to some embodiments, shall be further described with respect to FIG. 4.

In 402, the plug-in application 112 determines whether the page currently displayed in the browser 102 (herein called the "current page") is a product listing of a supported site. For example, the plug-in application 112 may perform 402 by analyzing the URL of the current page to identify the source or site of the current page. The plug-in application 112 may then compare this identified site to a list of supported sites (that may be stored in the layout DB 113, for example). In this way, the plug-in application 112 can determine whether the current page is for a supported site. Similarly, the plug-in application 112 may determine if the current page is a product listing (that is, a page that is listing a product for sale) by analyzing the information in the URL (and/or information in the current page itself) in a manner that will be appreciated by persons skilled in the relevant art(s) based on the teachings provided herein.

If the current page is for a supported site, then 404 is performed. In 404, the plug-in application 112 accesses layout information associated with the identified supported site from the layout DB 113, and uses the layout information to extract product information 108 from the listing 110.

If the current page is for a non-supported site, then 406 is performed. In 406, the plug-in application 112 parses the listing 110 to extract product information 108. For example, the plug-in application 112 may parse the listing 110 to identify keywords and characteristics of categories, and to thereby extract such keywords and characteristics from the listing 110. Keywords and characteristics of categories are further described below.

In some embodiments, the plug-in application 112 may extract the product information 108 from the listing 110 using a combination of 404 and 406. This may be done, for example, where the layout of a given supported site is only partially known. In such instances, the plug-in application 112 may use layout information from the layout DB 113 to extract as much product information 108 as possible per 404 (given the limited layout information that is known about the given supported site), and then parse the listing 110 for additional product information 108 per 406.

Example embodiments for extracting product information 108 from listings 110 are provided in U.S. patent application Ser. No. 16/288,199 titled "Inventory Ingestion, Image Processing, and Market Descriptor Pricing System," filed Feb. 28, 2019; and U.S. patent application Ser. No. 16/288,379 titled "Probabilistic Item Matching and Searching," filed Feb. 28, 2019; both of which are herein incorporated by reference in their entireties, and any of these incorporated embodiments may be used to implement some or all of 404 and/or 406.

As a result of parsing the listing 110 in 406, the plug-in application 112 may gain at least some information specifying the format and layout of the listing 110. Thus, in 408, the plug-in application 112 may store this information in the layout DB 113, and designate the site associated with the current page to be a supported site. Periodically, the plug-in application 112 may transmit layout information regarding new supported sites to the backend server 121. The backend server 121 may store such information in its layout DB 124, and periodically distribute its layout DB 124 to plug-in applications 112 in other computer devices, to enable those plug-in applications 112 to become aware of newly designated supported sites.

Referring back to FIG. 3, in 310, the plug-in application 112 transmits the extracted product information 108 to the backend server 121 via the network 114.

Figure 5:
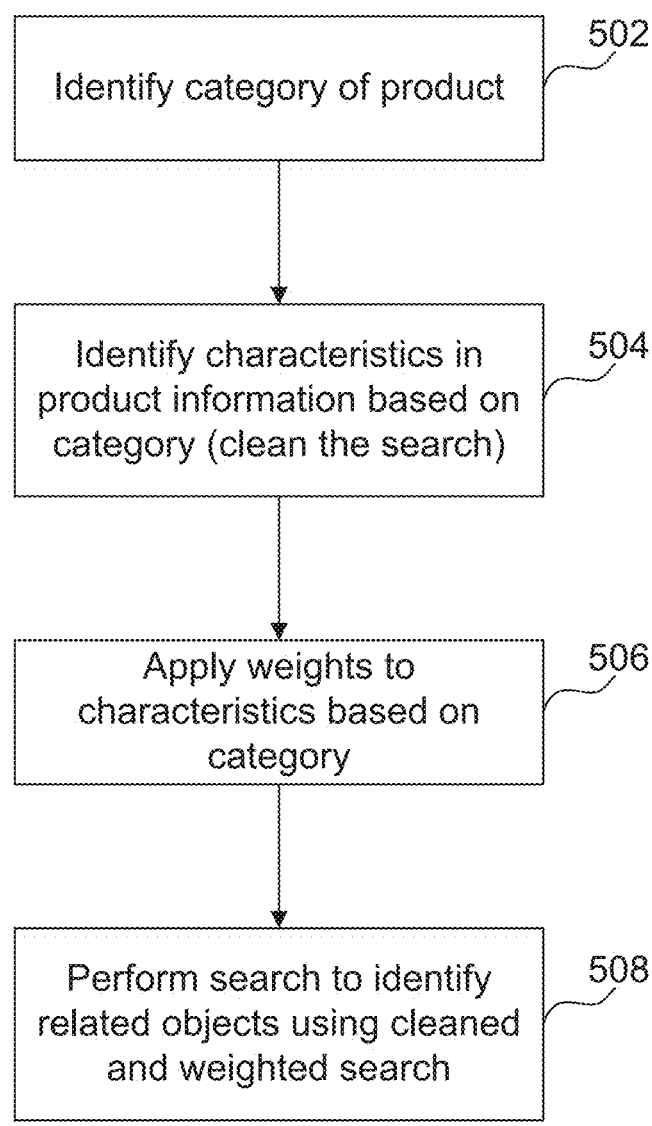

In 312, the processing units 122 of the backend server 121 perform a search of the inventory 117 using the product information 108 to identify related products 118. The related products 118 are products in the inventory 117 that are the same or similar to the product 106 in the listing 110 currently being displayed in the browser 102 of the first computing device 101. Operation of 312, according to some embodiments, shall now be further described with respect to FIG. 5.

In 502, the processing units 122 of the backend server 121 analyze the product information 108 to identify a category of the current product 110. According to some embodiments, each product in the inventory 117 is assigned to a category. The list of categories and information regarding each category are stored in a category database (DB) 120. For example, in 502, the processing units 122 may parse the product information 108 to identify keywords that operate to specify the category of the product 110. Each category may have one or more of such keywords, and such keywords may be stored and associated with their respective categories in the category DB 120. Thus, the processing units 122 may identify and extract keywords "Apple MacBook Pro" from product information 108A. These keywords may be associated with and specify a "notebook computer" category, or an "Apple MacBook Pro" category (it is noted that these categories are provided for illustrative purposes only).

The keywords for the categories may be manually determined and set. In other embodiments, the keywords for categories may be automatically determined using artificial intelligence and machine learning, by (for example) analyzing information on products in the inventory 117 to identify and score words that are commonly used to describe the same or similar objects, and also monitoring and analyzing activity of users 128B as they operate with the second ecommerce site 116, as further described below with reference to FIG. 6. Artificial intelligence and machine learning techniques that may be used include, but are not limited to, logistic regression, random forest regression models, and/or decision tree based algorithms, to name just some examples. The decision tree based algorithms can include, but are not limited to, boosted tree models, gradient boosting tree models, etc. According to some embodiments, deep learning models such as deep neural network models can also or alternatively be used.

In 504, the processing units 122 analyze the product information 108 to identify and extract characteristics pertaining to the current product 106, and the category of the current product 106. Each category may be associated with one or more characteristics that describe products in the category. For example, for the "notebook computer" category, the characteristics may include: screen size, screen resolution, RAM, secondary memory, WIFI, camera resolution, fingerprint scanning, numeric keypad, price, age, manufacturer, model, etc. The characteristics may be stored and associated with their respective categories in the category DB 120. Thus, in 504, the processing units 122 may parse and analyze the product information 108 to identify and extract information pertaining to the characteristics for the category identified in 502. For example, for the "notebook computer" category, the product information 108 in a given listing 110 may include information specifying the screen size, RAM, manufacturer, model, and price, but not screen resolution or the size of the secondary memory. The processing units 122 in 504 will extract whatever characteristics are contained in the product information 108 of the listing 110. Such extracted characteristics will be used as search parameters by the processing units 122 to perform a search of the inventory 117 for related projects 118. Because this search (sometimes called a "clean search") uses only the extracted characteristics as search parameters (and does not use other product information 108 in the listing 110 that may be superfluous and not relevant to the category of the current product 106), it will be more likely that the related products 118 identified by the search are not only the same or similar to the current product 106, but also are relevant and of interest to the user 128A.

In 506, the processing units 122 apply weights to the characteristics extracted in 504 to thereby generate cleaned and weighted search parameters. The weights are a measure of the importance of the characteristics relative to each other. Similar to using a clean search in 504, by applying weights to the characteristics in 506, it will be more likely that the related products 118 identified by the search in 508 are not only the same or similar to the current product 106, but also are relevant and of interest to the user 128A. The weights for the characteristics for the categories may be stored in the category DB 120.

Figure 6:
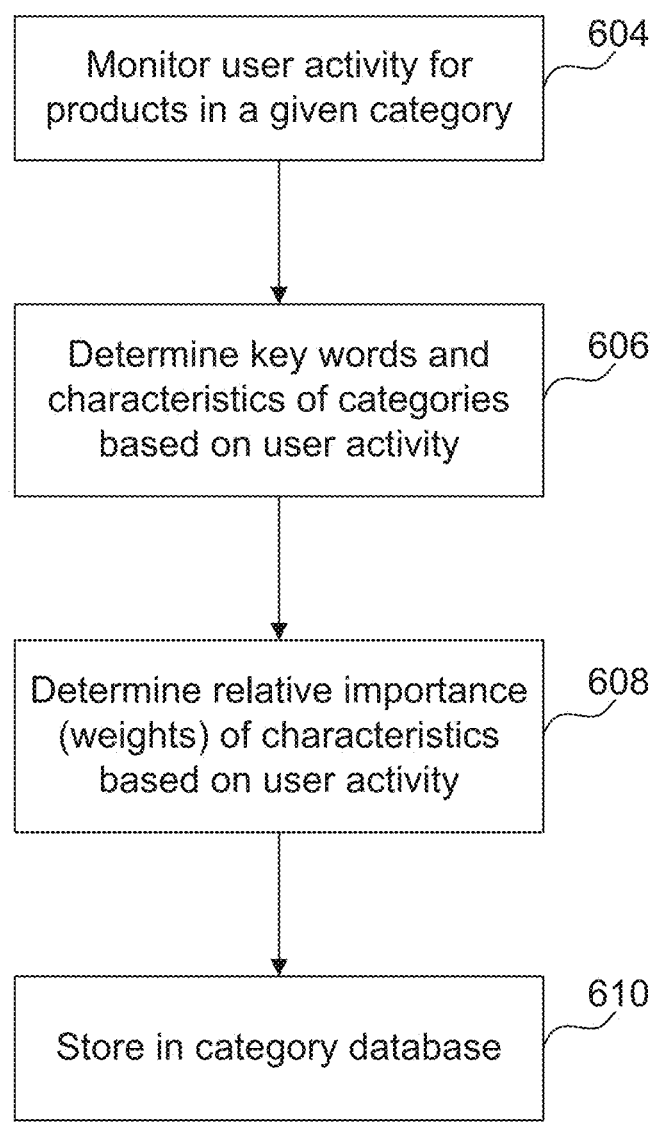

In some embodiments, the weights for the characteristics are generated according to method 602 in FIG. 6. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 602 shall be described with reference to FIGS. 1A, 1B and 2. However, method 602 is not limited to that example embodiment.

In 604, the processing units 122 of the backend server 121 monitor activity of users 128B while interacting at the second ecommerce site 116 via their respective second computing devices 124. For example, the processing units 122 may monitor searches executed by users 128B on the second ecommerce site 128B, product listings viewed by users 128B on the second ecommerce site 116, products that are purchased on the second ecommerce site 116, products that are not purchased on the second ecommerce site 116, etc. Information resulting from monitoring such activity is stored in the backend server 121 in an activity DB 126.

In 606, the processing units 122 analyze the information of 604 to identify key words and characteristics that define and described categories by parsing the product information 108 in product listings 110 in the inventory 117. For example, the processing units 122 in 606 may analyze product information 108 of the same or similar products in the inventory 117 (either active listings and/or sold listings) to identify common terms in such listings. For example, for the "notebook computer" category, the characteristics may include: screen size, screen resolution, RAM, secondary memory, WIFI, camera resolution, fingerprint scanning, numeric keypad, price, age, manufacturer, model, etc. The most commonly used terms may be designated to be keywords that characterize the category (for use in 502, for example). Other commonly used terms may be designated to be characteristics of the category (for use in 504-508, for example). In some embodiments, terms that are keywords for a category are also characteristics for the category.

In 608, the processing units 122 determine the weights (that is, the relative importance) of the characteristics of each category based on the monitored user activity from 604. For example, for the "notebook computer" category, the processing units 122 may analyze searches executed by users 128B on the second ecommerce site 128B, product listings viewed by users 128B on the second ecommerce site 116, products that are purchased on the second ecommerce site 116, products that are not purchased on the second ecommerce site 116, and determine the following:
  computers priced below $1000 sell faster than computers priced about $3000;
  computers with larger displays sell faster than computers with small displays;
  the size of RAM does not appear to impact how fast a computer sells, as long as the RAM is at least 4 GBytes; and
  computers with solid state drives sell faster than computers with non-solid state hard drives.

Based on the above examples, the processing units 122 may weigh the characteristics of the "notebook computer" category as follows:
  Price=display size>RAM>solid state drive>non-solid state hard drive (Weighted Scenario 1)

In other words, in this example of Weighted Scenario 1, price and display size are assigned the same weight, and their weighting is greater than the size of RAM, which is greater than a computer having a solid state drive, which is greater than a computer having a non-solid state drive.

In 610, the weights from 608 are stored in the category DB 120, and associated with their respective categories.

Referring back to FIG. 5, in 508, the processing units 122 in the backend server 121 perform a search of the inventory 117 to identify related products 118, using the cleaned and weighted search parameters. This search uses as search parameters the category characteristics of 504 as weighted in 506. Using the above weighted scenario 1, for example, the processing units 122 in 508 may perform a search where the most emphasis is on identifying computers that are priced below $1000, have a large display, and have RAM of at least 4 GBytes. Whether or not the computers have a solid state drive versus other type of hard drive may not be considered in the search, unless the number of search results is greater than a predetermined limit.

Other embodiments for identifying objects that are the same or similar to current product 106 are described in U.S. patent application Ser. No. 16/288,379, titled "Probabilistic Item Matching and Searching," filed Feb. 28, 2019, which is herein incorporated by reference in its entirety, and the processing units 122 may also or alternatively use any embodiment in this incorporated reference to identify related products 118 that are the same or similar to the current product 106.

Also or alternatively, other embodiments may be used to search the inventory 117 to identify related products 118. For example, in 508, the processing units 122 may take into consideration the sellability score and/or cancellability score of products in the inventory 117, such that emphasis may be placed on products having a higher sellability score and/or lower cancellability score when searching for the related products 118. A sellability score of a product is a measure of how likely the product will be sold. A cancellability score of a product is a measure of how likely the listing of the product will be cancelled by either the seller or potential buyer of the product. In some embodiments, sellability scores and/or lower cancellability scores may constitute characteristics of categories as used herein. Example embodiments for determining sellability and cancellability scores are described in U.S. patent application Ser. No. 16/288,158, titled "Determining Sellability Score and Cancellability Score," filed Feb. 28, 2019, which is herein incorporated by reference in its entirety, and the processing units 122 many use any embodiment(s) in this incorporated reference to determine and use sellability and/or cancellability scores in 508.

Figure 7:
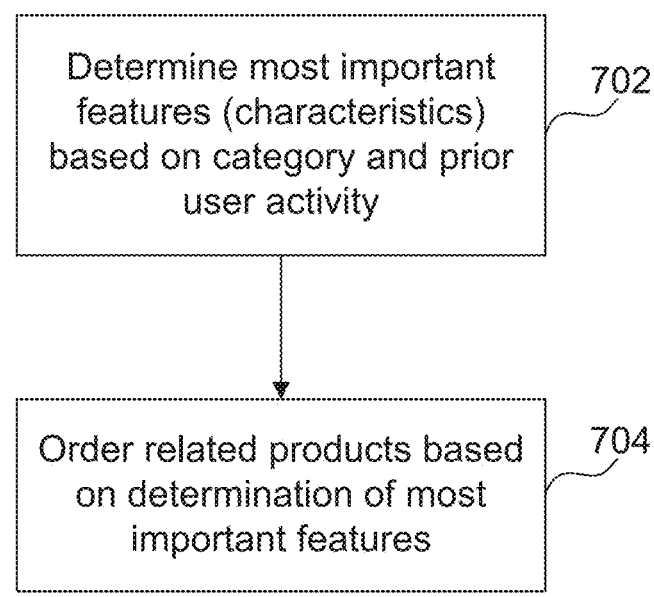

Referring back to FIG. 3, in 314, the backend server 121 sends a list of the related products 118 to the plug-in application 112 at the first computing device 101 via the network 114. Operation of 314, according to some embodiments, is described in more detail with reference to FIG. 7. Generally, as shown in FIG. 7, the processing units 122 of the backend server 121 order the list of the related products 118 so that it will be more likely that products that (1) are the same or the most similar to the current product 106, and/or (2) are of most interest to user 128A, will be displayed at the top of the list 204.

Thus, in 702, the processing units 122 determine the important features (that is, the characteristics) of the category of the current product 106. The category of the current product 106 was determined in 502. The characteristics of the category were determined in 504, based on monitoring and analyzing activity of users 128B while interacting with the second ecommerce site 116. These characteristics were weighted in 506.

In 704, the processing units 122 order the list of the related products 118 based on the weighted characteristics of the category of the current product 106. For example, for the "notebook computer" category, if the price and screen size characteristics have the greatest weights, then products having the lowest price and the biggest screen size would be ordered at the top of the list 204 of the related products 118.

Referring back to FIG. 3, in 316, the plug-in application 112 displays the number of related products 118 in the SP button 120. In the example of FIG. 1A, this number is 83, indicating that 83 related products 118 were found in the search performed in step 312.

In 318, upon the user 128A clicking or otherwise selecting the SP button 120, the browser 102 opens window 202 and displays therein the ordered listing 204 of the related products 118.

In 320, first Computing Device 101 responds to user input to select and purchase either current product 106 being offered by the first ecommerce site 103, or one or more of the related objects 118 being offered by the second ecommerce site 116. Where the user 128A wishes to buy a product from the second ecommerce site 116, the Plug-In 112 may navigate the browser 102 to the second ecommerce site 116.

Figure 8:
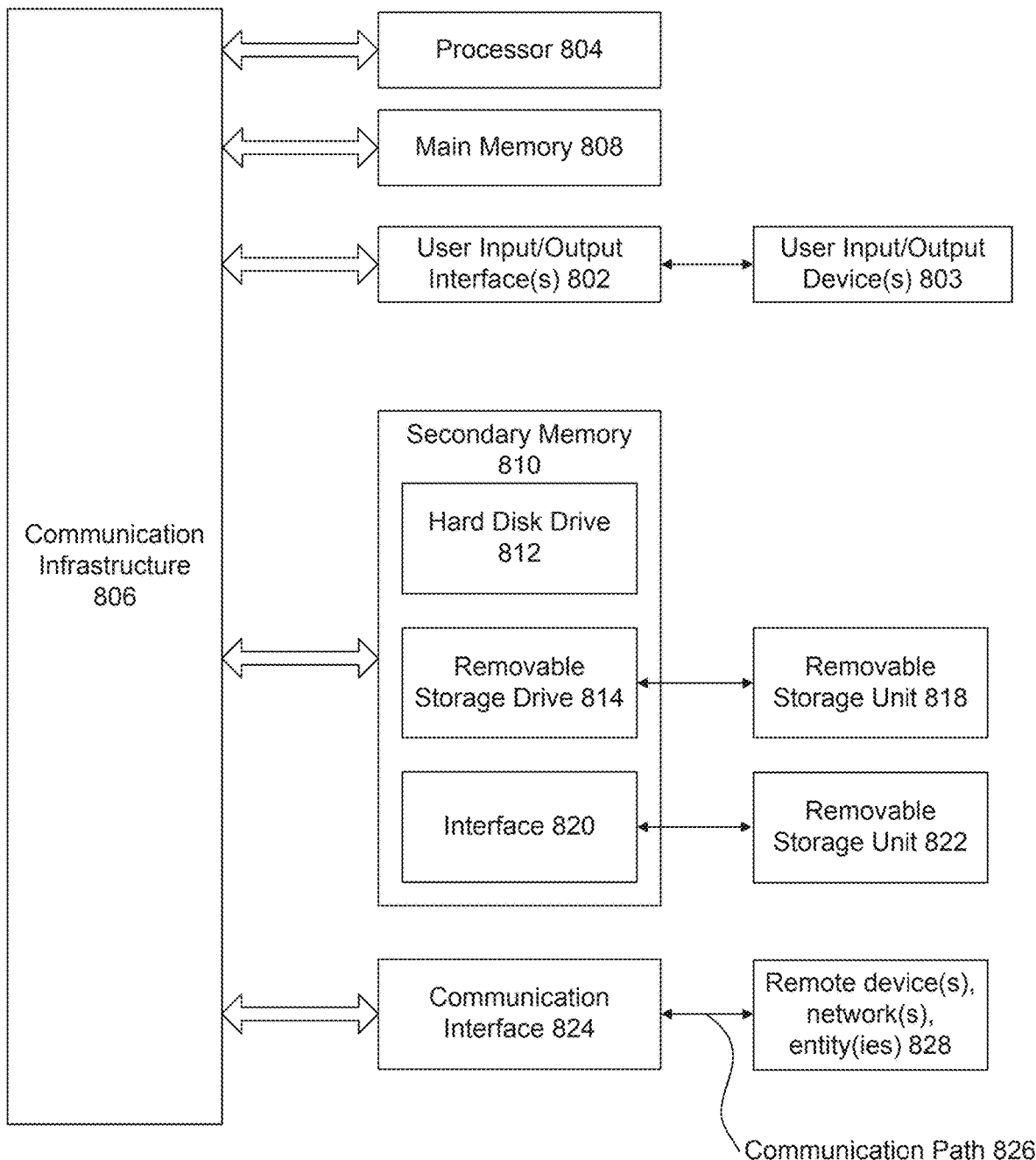
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    determining that an active webpage on a browser is from a primary website of a plurality of supported sites, each of the plurality of supported sites comprising a website for which a plug-in application operating on the browser is aware of where price and product information is located on the active webpage based on layout information retrieved from a layout database, and wherein an icon corresponding to the plug-in application is visible on the browser;
    identifying a current product displayed on the active webpage on the browser;
    identifying one or more related products from one or more secondary websites, different from the primary website, the identified one or more related products corresponding to the current product displayed on the active webpage of the primary website;
    determining a count of how many of the identified one or more related products from the one or more secondary websites were identified;
    updating the icon of the plug-in application displayed in the browser with a visual indication of the count; and
    displaying a list of at least a subset of the identified one or more related products as a drop down from the icon, responsive to detecting a selection of the updated icon, wherein the identified one or more related products displayed in the list are ordered based on a similarity of each of the identified one or more related products, of the subset, to the current product.

2. The method of claim 1, wherein the list includes a price of each of the subset of the identified one or more related products displayed on the list.

3. The method of claim 1, wherein the list indicates a name of the one or more secondary websites.

4. The method of claim 1, wherein the list is overlaid on top of at least a portion of the active webpage.

5. The method of claim 1, wherein the layout information retrieved from the layout database for the active webpage is received from the plug-in application operating on a different browser on a different computing device which provided the layout information to the layout database.

6. A system for generating and performing a replication task, comprising:
a memory; and
at least one processor coupled to the memory and configured to perform operations comprising:
determining that an active webpage on a browser is from a primary website of a plurality of supported sites, each of the plurality of supported sites comprising a website for which a plug-in application operating on the browser is aware of where price and product information is located on the active webpage based on layout information retrieved from a layout database, and wherein an icon corresponding to the plug-in application is visible on the browser;
identifying a current product displayed on the active webpage on the browser;
identifying one or more related products from one or more secondary websites, different from the primary website, the identified one or more related products corresponding to the current product displayed on the active webpage of the primary website;
determining a count of how many of the identified one or more related products from the one or more secondary websites were identified;
updating the icon of the plug-in application displayed in the browser with a visual indication of the count; and
displaying a list of at least a subset of the identified one or more related products as a drop down from the icon, responsive to detecting a selection of the updated icon, wherein the identified one or more related products displayed in the list are ordered based on a similarity of each of the identified one or more related products, of the subset, to the current product.

7. The system of claim 6, wherein the list is ordered based on which of the identified one or more related products is most similar to the current product.

8. The system of claim 6, wherein the list includes a price of each of the subset of the identified one or more related products displayed on the list.

9. The system of claim 6, wherein the list indicates a name of the one or more secondary websites.

10. The system of claim 6, wherein the list is overlaid on top of at least a portion of the active webpage.

11. A non-transitory computer-readable medium, having instructions stored thereon that, when executed by at least one computing device, cause the at least one computing device to perform operations comprising:
determining that an active webpage on a browser is from a primary website of a plurality of supported sites, each of the plurality of supported sites comprising a website for which a plug-in application operating on the browser is aware of where price and product information is located on the active webpage based on layout information retrieved from a layout database, and wherein an icon corresponding to the plug-in application is visible on the browser;
identifying a current product displayed on the active webpage on the browser;
identifying one or more related products from one or more secondary websites, different from the primary website, the identified one or more related products corresponding to the current product displayed on the active webpage of the primary website;
determining a count of how many of the identified one or more related products from the one or more secondary websites were identified;
updating the icon of the plug-in application displayed in the browser with a visual indication of the count; and
displaying a list of at least a subset of the identified one or more related products as a drop down from the icon, responsive to detecting a selection of the updated icon, wherein the identified one or more related products displayed in the list are ordered based on a similarity of each of the identified one or more related products, of the subset, to the current product.

12. The non-transitory computer-readable medium of claim 11, the operations further comprising:
detecting the selection of the updated icon including the visual indication of the count; and
displaying a list of at least a subset of the identified one or more related products responsive to the selection.

13. The non-transitory computer-readable medium of claim 12, wherein the displaying comprises:
displaying the list as the drop down from the icon in the browser.

14. The non-transitory computer-readable medium of claim 13, wherein the list is ordered based on which of the identified one or more related products is most similar to the current product.

15. The non-transitory computer-readable medium of claim 13, wherein the list includes a price of each of the subset of the identified one or more related products displayed on the list.

* * * * *